Jan. 5, 1960 J. G. CRUMP 2,920,208
INDICATING SYSTEM
Filed Sept. 16, 1957
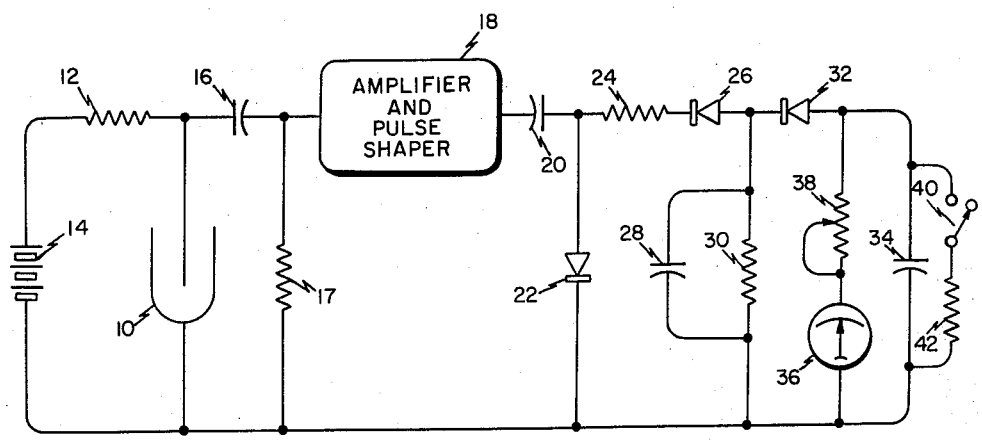
INVENTOR
JACK G. CRUMP

United States Patent Office 2,920,208
Patented Jan. 5, 1960

2,920,208

INDICATING SYSTEM

Jack G. Crump, Columbus, Ohio, assignor to Industrial Nucleonics Corporation, a corporation of Ohio Application September 16, 1957, Serial No. 684,164

3 Claims. (Cl. 250—83.6)

This invention relates to a measuring device such as an instrument for gauging the physical properties of materials and objects by penetrative radiation measurement techniques, and more particularly it relates to electronic circuitry providing improved performance from count rate indicating systems adapted for use in small portable instruments of the thickness gauge type.

There are many applications in industry, particularly the petroleum and chemical industries, for small, portable inspection devices of the type to which this invention pertains. As an example, the physical configuration of one specific device of this type and the uses therefor are described in U.S. Patent No. 2,486,902, issued November 1, 1949, to Alexander Wolf. An instrument having similar applications but employing a different principle of measurement is described in U.S. Patent Reissue No. 22,531 in the name of Donald G. C. Hare, originally Patent No. 2,277,756, dated March 31, 1942. In addition to their use as thickness measuring instruments, these devices may be modified or adapted for use in measuring the density of materials; particularly liquids. In special instances, ratios of substances composing mixtures may be gauged with convenience and tolerable accuracy.

In the design of a penetrative radiation device, radiological safety provisions are of paramount importance in view of the possible health hazard to operating personnel. To this end the safeguard of extensive shielding cannot be employed in the case of an instrument designed for portability and hand operation. It is therefore necessary to restrict the intensity of the working radiation beam to a very low level, as by limiting the quantity of radioactive material constituting the radiation source. This limitation in turn imposes restrictions on the choice of a radiation measuring instrument, as by requiring in most instances the use of pulse type detectors such as Geiger-Mueller tubes or scintillation detectors with inherently high amplification factors. Measurements of the output of such detectors is essentially a counting process wherein by some means the number of impulses produced by the detector is averaged over a period of time.

When averaged over relatively long periods of time, the emission of energy from a radioactive source is remarkably steady and constant, even in the case of a source of quite low activity. However, if the time periods of observation are reduced to shorter and shorter intervals, fluctuations in the intensity of the emission become more and more apparent in accordance with the random nature of nuclear disintegration processes, which obey the mathematical laws of statistics. These laws predict that the counting and averaging process will be subject to a relative probable error which varies inversely with the square root of the number of counts averaged in an individual measurement.

In laboratory measurements, pulse counting is done in strictly arithmetic fashion over closely timed intervals. However, in devices such as a portable thickness gauge, it is more convenient and economical of equipment and/or labor to transform a succession of pulses into a unidirectional voltage having a magnitude in accordance with the rate of arrival of pulses from the detector. These raw pulses may be of varying amplitude, width, and shape. Conventionally, therefore, each pulse is amplified, shaped to a predetermined pattern of equality, and fed into an integrating circuit comprising a resistor-capacitor combination providing a voltage across the capacitor which corresponds to the number of pulses arriving at the capacitor in a time interval proportional to the time constant of the integrating circuit. This voltage is read out on a meter which may be suitably calibrated in counts per unit time, or more directly in terms of a variable property functional thereof such as thickness or density of an object or material sample.

With a low intensity source as required by radiological safety considerations, the statistical fluctuations in the pulse rate must be specifically dealt with in the design of the integrator. In instruments utilizing conventional resistance-capacity integrating circuits, the time constant selected must result in a rather unsatisfactory compromise between a tremulous and wavering indication difficulty of accurate interpretation on the one hand, and a sluggish and unresponsive performance on the other.

In accordance with this invention, there is provided an improved integrating circuit which may be termed a "peaking integrator" whereby the response time of a count rate indicating system may be significantly upgraded without permitting an objectionable degree of random fluctuation to affect the accuracy and readability of the indication obtained thereby.

It is an object of this invention to provide an improved count rate integrator circuit.

It is a further object to provide a radiation measuring instrument having improved accuracy and faster response time.

It is another object to provide a radiation measuring instrument whose readout indication is not susceptible to subjective errors in the interpretation thereof.

It is a still further object to provide an improved radiation instrument of the portable thickness gauge type.

It is also an object to provide an integrator circuit for effecting the above objects which is simple and economical of design.

Further objects and advantages of the present invention will become apparent in the following detailed description given with reference to the accompanying drawing.

The single figure of the drawing is a simplified schematic diagram of a radiation measuring instrument incorporating a count rate indicating circuit in accordance with the present invention.

Referring now to the drawing, the numeral 10 indicates a radiation detector to which a unidirectional voltage is supplied through a load resistor 12 from a voltage source represented by the battery 14. In the well known manner, an ionizing event occurring in the detector momentarily reduces the impedance thereof, whereupon the voltage drop across the load resistor 12 results in a corresponding decrease in the potential across the detector 10, thus generating a pulse which is fed through a differentiating circuit comprising capacitor 16 and resistor 17 to the input of an amplifier and pulse shaper unit 18. The unit 18 modifies succeeding input pulses into output pulses having congruity of shape for delivery to the count rate indicating system. Inasmuch as the portion of the apparatus depicted by numerals 10—18 is conventional and furthermore may take any one of a variety of possible forms, further explanation thereof is considered unnecessary.

The indicating system of the present invention, which may in fact be adapted for use as a pulse rate meter in conjunction with any apparatus providing substantially uniform pulses whose repetition rate is to be determined, is coupled to the source thereof 18 through a charging capacitor 20. The pulses to be integrated are clamped to line 21 by means of an asymmetrical conduction device represented as a diode 22, and fed through a resistor 24 and diode 26 to a first integrating capacitor 28 in parallel connection with a resistance 30. A third diode 32 connects this circuit to a further integrating capacitor 34 shunted by a high impedance circuit which includes an indicating meter 36 having a calibrating rheostat 38 in series therewith. A normally open switch 40, preferably of the pushbutton type, is provided whereby a shunt resistor 42 may be connected across the terminals of capacitor 34.

It is seen that each of the diode-capacitor combinations 26—28 and 32—34 may function in the manner of a conventional uncompensated stairstep voltage generator wherein uniform unidirectional pulses are delivered through an impedance as provided by resistor 24 so as to place cumulative increments of charge on the capacitor, resulting in a stepwise increase of potential thereacross; the rise of succeeding steps decreasing in exponential fashion.

Accordingly if it is assumed that capacitors 28 and 34 are initially discharged and that a series of unidirectional voltage impulses from the injector circuit 20—26 is commencing, the integrating capacitors 28 and 34 will begin charging in essentially the above described stepwise fashion. During the charging process, both capacitors will simultaneously acquire potentials of essentially equal value, at a rate dependent on the time constant provided by resistor 24 and the combination of capacitors 28 and 34 in parallel, since the diodes 26 and 32 pass current impulses to both capacitors with substantially equal facility. Due to the presence of resistor 30, a decay of the potential across capacitor 28 is superimposed on the buildup thereof. This potential decay proceeds in accordance with the time constant of resistor 30 and capacitor 28, and results in an inconsequential ripple component in the rise of potential across capacitor 28 such that the waveform thereof may appear more serrate than stepped of profile.

On the other hand, any decay of the potential across the second integrating capacitor 34 is substantially prohibited, inasmuch as the value selected for capacitor 34 is preferably quite large in comparison with that of capacitor 28; and the impedance of the indicating meter circuit 36—38 is no lower than is necessitated by the power requirements of a highly sensitive indicating device.

When a given average pulse rate is maintained for a period of time and this period is followed by an interval during which pulses are arriving at a lower rate, the potential across capacitor 28 will momentarily be dissipated through resistor 30 more rapidly than it can be restored by the current impulses from charging capacitor 20, thereafter attaining a net equilibrium value less than that maintained across capacitor 34, which in the meantime provides a steady indication on meter 36 of the peak value which obtained previously.

If now the pulse rate should increase beyond the original rate still registered on capacitor 34, the potential across capacitor 28 will increase in step fashion. So long as this potential is lower than that on capacitor 34, its individual rises are much higher than in the original charging instance above described, since only the time constant of capacitor 28 and resistor 24 are involved. It is apparent, however, that the high count rate now assumed must persist for the time necessary to permit the potential on capacitor 28 to exceed that on capacitor 34 in order for the integration system to return to the first described mode of operation wherein the count rate indication may assume a further increase.

The system of the invention thus constitutes essentially a peak reading integrator providing a count rate indication which does not fall perceptibly during a lull in the arrival of pulses at the detector, and having a further advantage in that the indication is substantially unaffected by short bursts of radiation energy which are not representative of the average count rate. In using the instrument for purposes as described hereinabove, the gauging head is held in measuring position until the indicator movement ceases, whereupon a reading may be taken with assurance of accuracy. Between readings, the integrator is reset by the use of switch 40, which discharges capacitor 34 through resistor 42.

While the invention has been illustrated and described in connection with one specific apparatus, it will be understood that such illustration and description are given by way of example only, and that many changes and modifications thereof may be made without departing from the spirit and scope of the invention as is set forth in the appended claims.

What is claimed is:

1. A measuring instrument comprising a detector means providing electrical pulses having a repetition frequency functional of the rate of arrival of ionizing radiation energy incident thereon, means for modifying said pulses to mutually equalized impulses, first and second accumulators for respectively registering first and second indications, said indications each comprising aggregates of said impulses, means for continuously producing diminution of said first indication, means for preventing any substantial change in said second indication when said first indication is less than said second indication, means for apportioning an increase in said aggregates between said first and second accumulators whenever said first indication is not less than said second indication, and means for translating said second indication into a quantity functional of said repetition frequency.

2. A measuring instrument comprising a detector means providing electrical pulses having a repetition frequency functional of the rate of arrival of ionizing radiation energy incident thereon, means for modifying said pulses substantially to mutual congruence, an injector circuit for converting said modified pulses to unidirectional voltage impulses, a shunt connected resistance-capacitance network in impulse receiving relation to said injector circuit, a serially connected combination of a capacitor and an asymmetrical conduction device in parallel connection with said network, and means responsive to an electrical potential across said capacitor for indicating a quantity functional of said repetition frequency.

3. A count rate meter for indicating the average repetition frequency of a succession of mutually uniform voltage pulses appearing between first and second conductors, comprising a first capacitor, an impedance, first and second asymmetrical conduction devices and a second capacitor serially connected in the order named to complete a circuit between said first and second conductors, each of said first and second asymmetrical conduction devices being arranged to present its maximum impedance to current flow in the same direction between said conductors, a third asymmetrical conduction device connecting the junction of said first capacitor and said impedance to said second conductor, said third asymmetrical conduction device being arranged to present its maximum impedance to current flow between said first and second conductors in a direction opposite to said first named current flow, a shunt connected resistance-capacitance network connecting the junction of said first and second asymmetrical conduction devices to said second conductor, and means responsive to an electrical potential across said second capacitor for indicating said average pulse repetition frequency.

References Cited in the file of this patent

UNITED STATES PATENTS

| | | |
|---|---|---|
| 2,672,561 | Lichtman | Mar. 16, 1954 |
| 2,675,484 | Hepp | Apr. 13, 1954 |
| 2,752,508 | Zito | June 26, 1956 |